F. ATHIMON.
MACHINE FOR MAKING SPLIT COTTER PINS, SPRING WASHERS, THIMBLES, AND LIKE ANNULAR MEMBERS.
APPLICATION FILED JUNE 22, 1920.
1,408,063.
Patented Feb. 28, 1922.
5 SHEETS—SHEET 1.
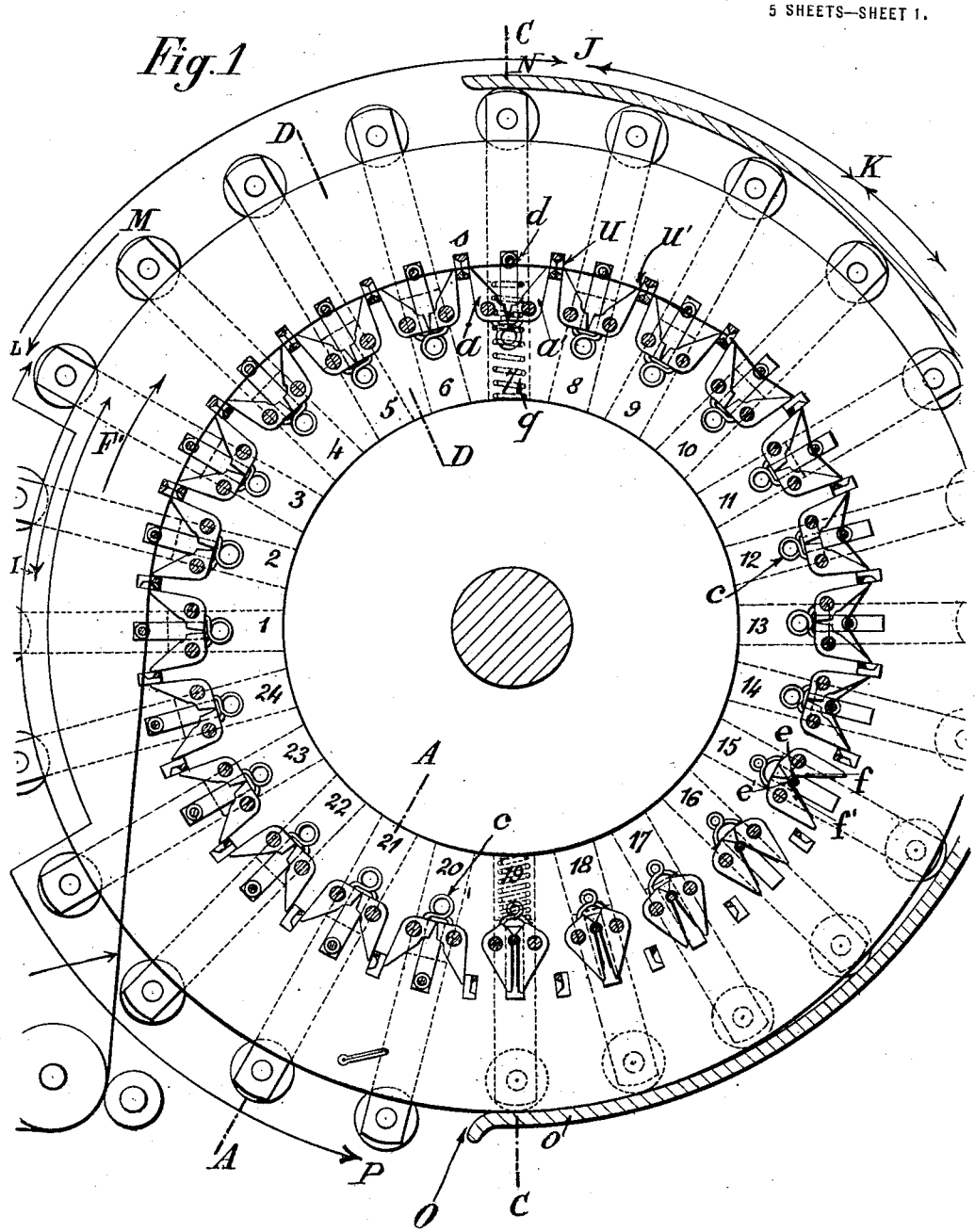
Fig. 1
Fig. 11   Fig. 12 
INVENTOR:
Francis Athimon
By Lawrence Langner
ATTORNEY

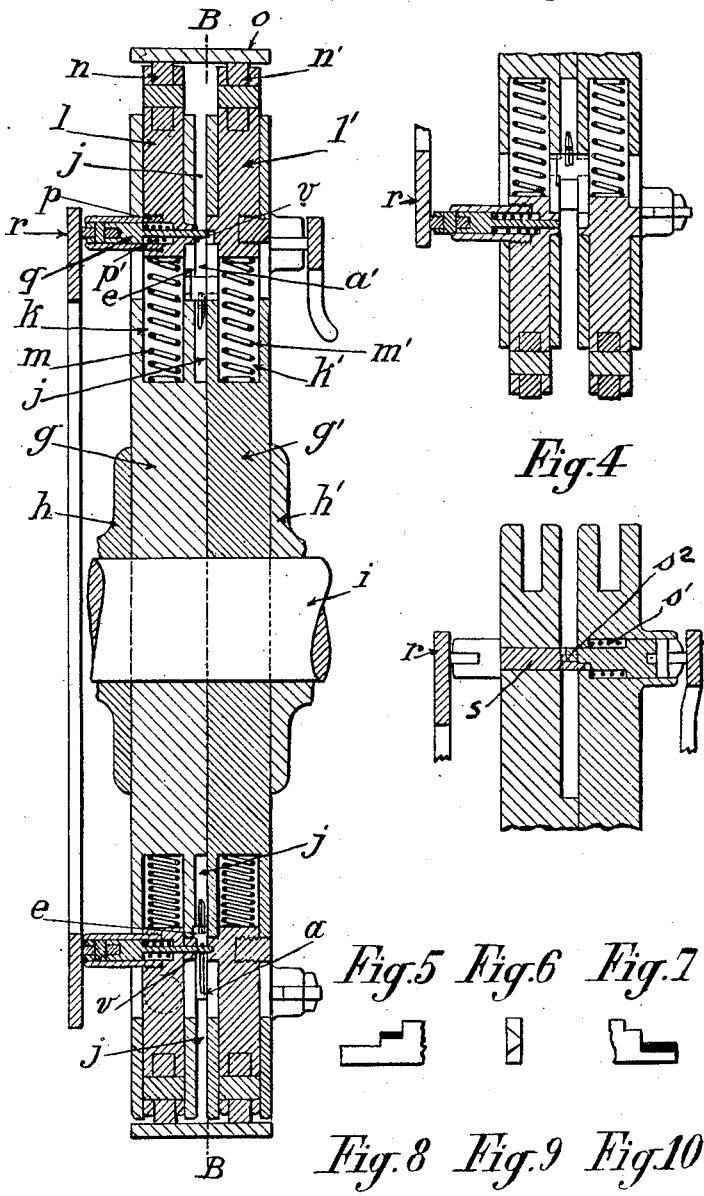

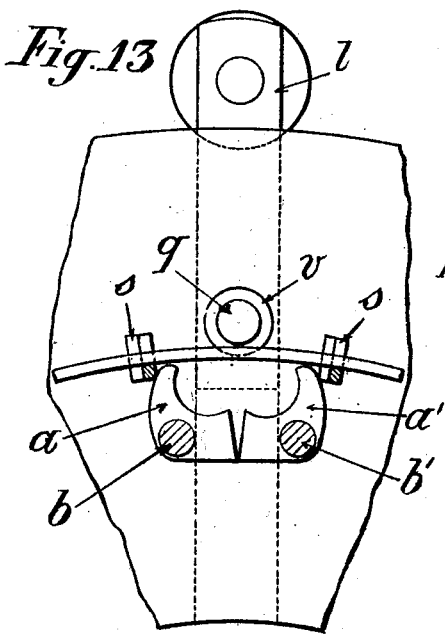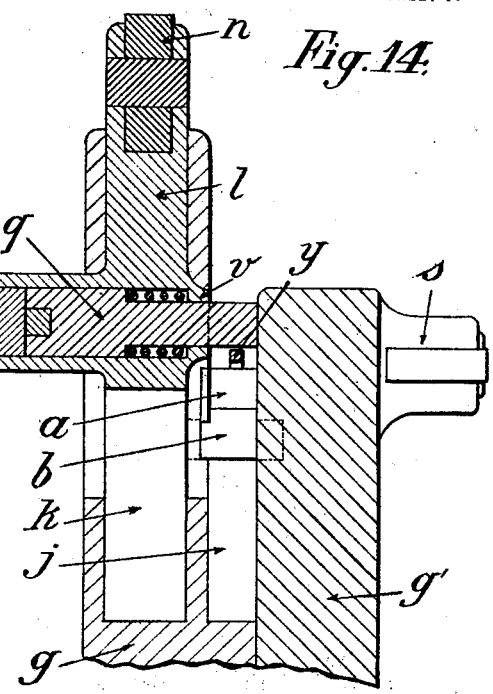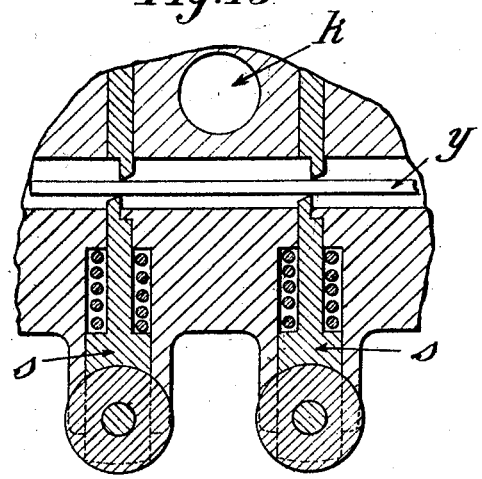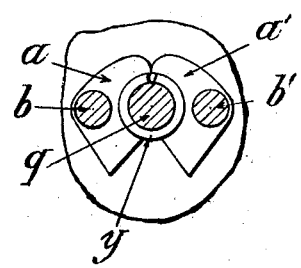

F. ATHIMON.
MACHINE FOR MAKING SPLIT COTTER PINS, SPRING WASHERS, THIMBLES, AND LIKE ANNULAR MEMBERS.
APPLICATION FILED JUNE 22, 1920.
1,408,063.
Patented Feb. 28, 1922.
5 SHEETS—SHEET 4.
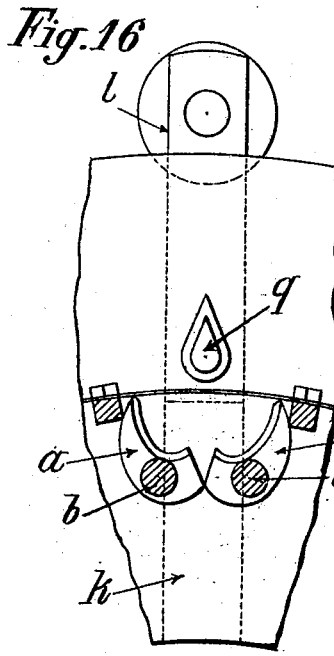
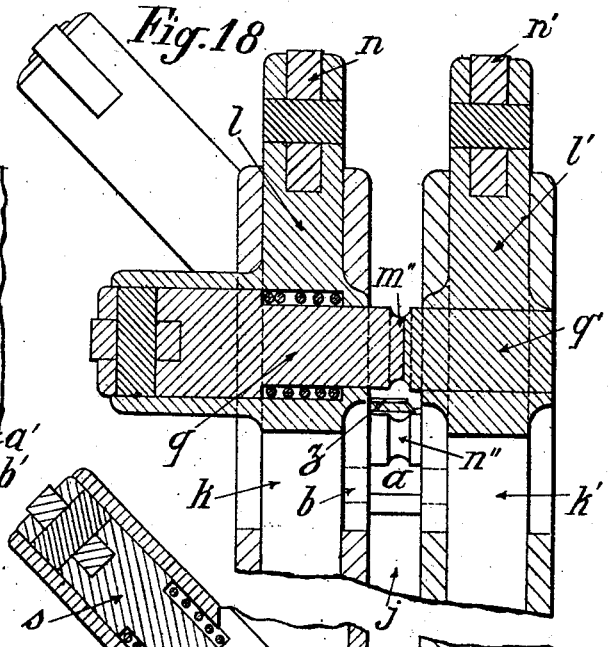
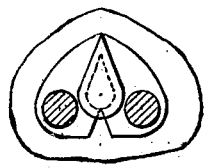
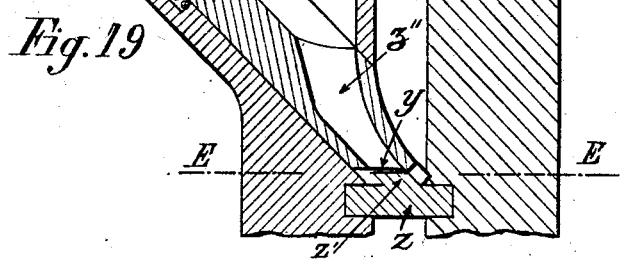
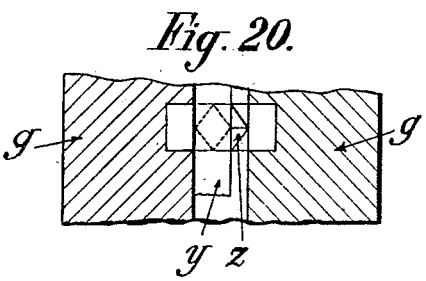
INVENTOR:
Francis Athimon
By Lawrence Langner
ATTORNEY.

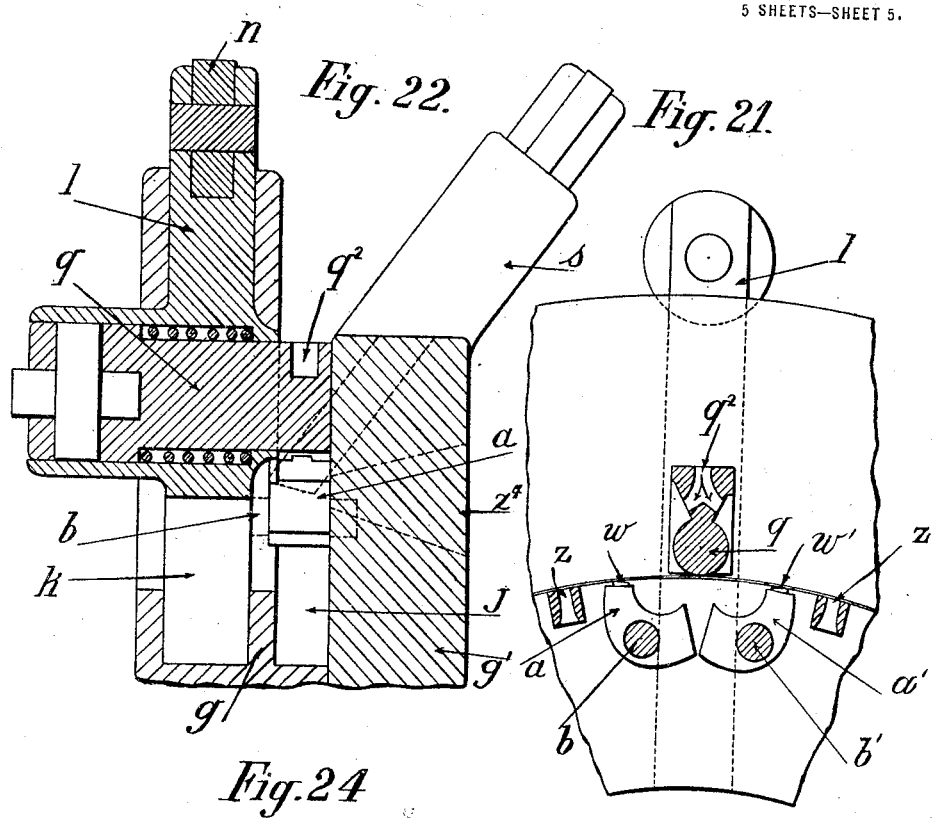

UNITED STATES PATENT OFFICE.

FRANCIS ATHIMON, OF PARIS, FRANCE.

MACHINE FOR MAKING SPLIT COTTER PINS, SPRING WASHERS, THIMBLES, AND LIKE ANNULAR MEMBERS.

1,408,063. Specification of Letters Patent. Patented Feb. 28, 1922.

Application filed June 22, 1920. Serial No. 390,960.

(GRANTED UNDER THE PROVISIONS OF THE ACT OF MARCH 3, 1921, 41 STAT. L., 1313.)

*To all whom it may concern:*

Be it known that I, FRANCIS ATHIMON, a citizen of the Republic of France, residing at 10 Rue Auguste Chabrières, Paris, in the Republic of France, have invented new and useful Improvements in Machines for Making Split Cotter Pins, Spring Washers, Thimbles, and like Annular Members, (for which I have filed an application in France March 31, 1919, Patent No. 497,712,) of which the following is a specification.

This invention relates to a machine for making split cotter pins, spring washers, thimbles, pipe collars and generally speaking all similar articles, the form of which corresponds to an open ring. Said machine is capable of operating continuously and comprises rotatable disc plates provided with a series of identical operating devices, each of them comprising a system of knives, mandrel and cams driven by suitable gradients and recalling springs, the knives acting first as feeding means for the wire or sheet plate material from which the desired article will be obtained and cutting thereafter the same at the desired length. The operative members of the machine are changed according to the kind of article to be obtained.

In the annexed drawings, given by way of example:

Fig. 1 is a sectional front view of a machine in accordance with the invention and adapted for split cotter pins manufacturing, the section being taken on the line B—B, Fig. 2.

Fig. 2 is a section on line C—C (Fig. 1).

Figs. 3 and 4 are respectively sectional views on lines A—A and D—D (Fig. 1).

Figs. 5 to 12 show the knives of the machine.

Figs. 5, 6 and 7 refer to the fixed knife showing it respectively in left side, in front and in right side view.

Figs. 8, 9 and 10 refer to the moving knife which is shown respectively in left, front and right side view; and Figs. 11 and 12 respectively show the arrangement of the knives in opened and closed positions.

Figs. 13, 14, 15 and $15^{bis}$ show different shapes of members (mandrel, cams, knives) corresponding to a machine for making "grover" washers.

Figs. 16, 17, 18, 19 and 20 are other different shapes of such members corresponding to the case of thimbles manufacturing, Fig. 20 being a section on line E—E (Fig. 19).

Figs. 21 to 24 correspond to collars manufacturing.

An important advantage of the machine consists in its high producing efficiency. Referring to Figures 1 to 12, the machine shown is adapted for split cotter-pins manufacturing. It comprises two discs $g$ and $g'$ (Fig. 2) assembled by cheeks $h$ and $h'$ on the shaft $i$, a peripheral groove $j$ being provided; said groove extending radially to a certain depth between said discs which form together a rotating plate.

Inside these discs are bored a suitable number of cylindrical openings $k$ and $k'$ receiving the mandrel-holders $l$ and $l'$ and the springs $m$ and $m'$ intended to push said holders outside of said openings. The outside part of these mandrel-holders is provided with a yoke $n$ and a roller $n'$ for reducing the friction on the gradient $o$. In the inside part of said holders is screwed a socket $p$ in which is located the mandrel $q$. Said mandrel consists of a cylindrical part provided with a yoke and a roller and of a finger constituting the properly called mandrel. A spring $p'$ continuously pushes the whole against the gradient $r$. At the lower part of mandrel holder $l'$ is secured a semicylindrical opening intended to receive the finger mandrel in a certain position.

In the groove $j$ are located, in a corresponding number, blocks of similar cams $a$, $a'$ and in the side-walls the axles of said cams. Said cams are kept open under the action of springs $c$.

Between the blocks of cams are secured the knives (Figs. 1 and 4). Said knives are made of two parts (see Fig. 4), one $s$ being fixed, the other $s^2$ movable. The movable part slides in the disc $g'$ and is outwardly pushed by a spring $s'$ on the gradient $t$.

The movable knives are alternately placed frontwards and backwards with reference to the direction of rotation of the machine.

The sections of wire after being cut are thus parallel situated to the plane of rotation. The whole machine, the gradients excepted, is rotatable in the direction of arrows F¹. The wire material T, of convenient thickness, is unwound out of a reel and continuously feeds the machine.

During the rotation from I to J (Fig. 1) the knives progressively close and insure the driving of wire; from J to K they keep closed, from K to L'' they open, from L'' to I they stay open; such movements being caused by the gradient t.

During the rotation from L to M the mandrels come into the groove j (Figure 2). From M to O they keep entirely engaged in said groove; from O to P they draw back, and from P to L they keep entirely out of the groove, such movements being secured by the gradient r.

During the rotation from N to O the mandrel-holders progressively move towards the cams, such movement being insured by the gradient o. From O to P, the said holders are at once removed and stay in such position from P to N.

Considering the block of cams and the mandrel starting from position 1 (Fig. 1) and executing a complete revolution:

In position 1, the mandrel is drawn back and the wire comes into the opening between the blades and the knives (Fig. 11). In position 2, the knives start cutting the wire; in position 4, the mandrel starts over coming the wire; in position 7, the mandrel-holder and consequently the mandrel itself come into motion towards the block of cams. In position 8, the cutting by the knives is completed the ends of the sections of wire are fastened into the hollows u and u' and the mandrel starts pressing upon the wire. In position 9, the knives keep in an unchanged position and the mandrel still presses upon the wire. In position 10, the mandrel further moves inwardly and the opening of the knives begins; in position 11, the knives are entirely opened. From position 11 to position 14, the mandrel still further moves without any other changing. In position 15, the part v of the mandrel-holder (Fig. 2) commences pressing upon the heel-pieces e e' of the cams whereby the nibs f f' close; such closing continues until position 19 forming the bend of the split cotter pin. Between position 19 and 20 the mandrel holders quickly move outwards; as the part v is no more in contact with the heel-pieces e e', the cams open under the action of spring c and the mandrel q itself draws entirely back out of the groove j, thus ejecting the cotter pin which by gravity and centrifugal force is projected out of the machine. From position 20 to position 1, the mandrels, mandrel-holders, knives and blocks of cams keep in an unchanged position.

At each revolution of the machine, each block of cams having occupied said various positions, a number of pins equal to the number of blocks of cams and mandrels is produced. If the machine is fed with several wires, placed side by side, said production is to be multiplicated by the number of wires. It is obvious that the number of blocks of cams and mandrels is not limited and that as many pins will be obtained at each revolution as blocks will be provided.

In case the machine is adapted for making "grover" washers (Figs. 13 to 15^bis) the general arrangement is the same as for cotter pins but the forms of knives, mandrels and blocks of cams are changed, said operating members being disposed as follows:

The mandrel itself having a comparatively strong section may work in an overhung position, the mandrel holder l' as used in the case of the manufacture of cotter-pins being then omitted. The cams are shaped as shown in Figures 13 and 15^bis. The cutting part of the knives instead of presenting a right angle, as for pins making, has an acute angle to cut on a sharp edge the ends of the washer intended to form a spring. The movable knives all cut behind the fixed knives (with reference to the direction of rotation of the machine). Such device permits the wire after being cut to be placed obliquely with reference to the plane of rotation of the machine, such obliqueness being necessary to give the washer a spiral form.

The general device of the machine for making thimbles (Figs. 16 to 20) is the same as for cotter-pins except in what concerns the forms of knives, mandrels and blocks of cams. As the thimble because of its shape is due to be formed inside a groove provided in the mandrel, it is necessary, in view of its ejection to divide said groove in two parts, a smaller one being provided in the mandrel holder l', a larger one in the mandrel holder l which insures the ejection. The cams are shaped as shown in Figures 16 and 17. It will be noted that, in the closing position, said cams entirely surround the thimble, so as to effect a proper shaping of the same. Their facing sides present a semi-annular projection having a semi-circular cross section. Instead of knives as in the device for cotter-pins making, the machine is provided with punches s (Fig. 19), said punches cutting the sheets at the right size, shaping the ends and pushing every element of sheet when cut under the non ejecting half mandrels q'. They consist of a fixed piece z (Fig. 19) provided with an oblique counter punch z' having a diamond shaped section, on which the sheet is to be wound, and of a punch $s$ having a corresponding form, which cuts the sheet by pressing it on said counter-punch $z'$. When the sheet is cut, the forks then formed at the ends of each strip come upon the piece $z$ and are pushed under the fixed mandrel $q'$ by the obliqueness of the piece $z'$. To allow the winding of the strip the punch slides at a determined angle with reference to the plane of rotation.

The general arrangement of the machine for making collars (Figs. 21 to 24) is the same as for cotter-pins making, the knives, mandrels and blocks of cams being changed. In such case, besides, the shaping, the rounding off the ends of each strip of sheet as well as the punching of holes to receive the bolts are to be executed. Said rounding off is made by the punch $s$ instead of the knives for cotter pins making, and said punching of holes is made by other punches secured on the cams and the mandrel. As the mandrel $q$ may be strong enough, the machine comprises a single mandrel holder $l$. The part of the mandrel shaping the collar has a section shown in Figures 21 and 23, such section having the outside form of a collar. Moreover, the mandrel is provided with a recess $q^2$ intended to receive the punches $w$ $w'$ of cams $a$ $a'$ and to evacuate the cut off parts of the collars. The punches thus substituted for the knives have the double object of cutting the sheet at the right length and of rounding off their ends. Said punches are constituted as follows:

The iron sheet is rounded upon a female piece $z^3$ (Fig. 24) said piece being fixed, the recess of said piece communicates with another recess $z^4$ of discs $q'$ to allow the evacuation of the falls. A punch of convenient shape presses on the strip at the wanted time and penetrates the piece $z^3$ thereby cutting the strip in the form of said piece $z^3$. As said punch is not to remain inside the groove $j$ as it would disturb the winding of the strip, it slides under a certain angle with reference to the plane of rotation instead of sliding in the plane itself.

Having now described my invention, what I claim as new and desire to secure by Letters Patent is:

1. A machine for making articles the form of which corresponds to an open ring comprising a frame, a rotating plate, a series of identical devices on said rotating plate, said devices being constituted by several operative members, some of them acting parallelly and the other perpendicularly to the plane of rotation, gradients on the frame, rollers guided by said fixed gradients and adapted to actuate the said operating members, and a material carrying reel on the frame, substantially as described and for the purpose set forth.

2. A machine for making articles the form of which corresponds to an open ring, comprising a frame, a rotating plate having radial holes therein, mandrel holders located in said holes and outwardly pushed by springs, friction rollers provided at the top of said holders, mandrels provided at the basis of said holders and parallel to the axis of the machine, a fixed gradient radially actuating said holders by said friction rollers, carrying or cutting members acting perpendicularly to the plane of rotation, shaping members acting parallelly to the plane of rotation, fixed gradients actuating said members and a material carrying reel on the frame, substantially as described and for the purpose set forth.

3. A machine for making articles the form of which corresponds to an open ring, comprising a frame, a rotating plate having radial holes therein, mandrel holders located in said holes and outwardly pushed by springs, friction rollers provided at the top of said holders, mandrels provided at the basis of said holders and parallel to the axis of the machine, a fixed gradient radially actuating said holders by said friction rollers, an outwardly projecting rod on each of said mandrels, a friction roller on each of said rods, a gradient parallel to the plane of rotation actuating the corresponding mandrel, a spring contacting said roller with said gradient, a groove in said plate, a finger on each of said mandrels inwardly projecting across said groove and driven by the corresponding mandrel holders, said finger pressing upon the wire or sheet and ejecting the finished article at the end of the operation, carrying or cutting members acting perpendicularly to the plane of rotation, shaping members acting parallelly to the plane of rotation, fixed gradients actuating said members, and a material carrying reel on the frame, substantially as described and for the purpose set forth.

4. A machine for making articles the form of which corresponds to an open ring, comprising a frame, a rotating plate having radial holes therein, mandrel holders located in said holes and outwardly pushed by springs, friction rollers provided at the top of said holders, mandrels provided at the basis of said holders and parallel to the axis of the machine, a fixed gradient radially actuating said holders by said friction rollers, an outwardly projecting rod on each of said mandrels, a friction roller on each of said rods, a gradient parallel to the plane of rotation, actuating the corresponding mandrel, a spring contacting said roller with said gradient, a groove in said plate, a finger inwardly projecting in an overhung position across said groove and driven by the corresponding mandrel-holder, said finger pressing upon the article or fabrication and ejecting it at the end of the operation, carrying or cutting members acting perpendicularly to the plane of rotation, shaping members acting parallelly to the plane of rotation, fixed gradients actuating said members, and a material carrying reel on the frame, substantially as described and for the purpose set forth.

5. A machine for making articles the form of which corresponds to an open ring, comprising a frame, a rotating plate, mandrels and mandrel-holders located in said plate, fixed gradients actuating these members, material cutting devices secured in the intervals between the mandrels, in each device, a knife fixed, and another cooperating knife movable in said plate, a recalling spring and a friction roller on said movable knife, a gradient parallel to the plane of rotation actuating said roller, and a material carrying reel on the frame of the machine, substantially as described and for the purpose set forth.

6. A machine for making articles the form of which corresponds to an open ring, comprising a frame, a rotating plate, mandrels and mandrel holders located in said plate, fixed gradients actuating these members, sheet cutting devices secured in the intervals between the mandrels, in each device, a knife fixed and another cooperating knife movable in said plate, a recalling spring and a friction roller on said movable knife, a gradient parallel to the plane of rotation actuating said roller, the movable knives all cutting the wire or sheet behind the fixed knives so as to present the cut sections obliquely with reference to the plane of rotation and a material carrying reel on the frame of the machine, substantially as described and for the purpose set forth.

7. A machine for making articles the form of which corresponds to an open ring, comprising a frame, a rotating plate, mandrels and mandrel holders located in said plate, fixed gradients actuating these members, material cutting devices secured in the intervals between the mandrels, first fastening and driving said wire or sheet before progressively cutting it, and a material carrying reel on the frame of the machine, substantially as described and for the purpose set forth.

8. A machine for making articles the form of which corresponds to an open ring, comprising a frame; a rotating plate, a series of identical devices on said plates embodying knives, mandrels, mandrel holders and blocks of cams, said cams being normally kept open by a spring and presenting an internal shape exactly corresponding to the form of the article to be made, heel pieces on said cams actuated by the mandrel holders and progressively closing said cams when said holders gradually move towards the center of the plate, fixed gradients actuating the several operating members and a sheet carrying reel on the frame of the machine and continuously feeding the said machine.

9. A machine for making articles the form of which corresponds to an open ring, comprising a frame, a rotating plate, a series of identical devices on said plates, comprising series of knives, mandrels, mandrel holders and blocks of cams, said cams being normally kept open by a spring and presenting an internal shape exactly corresponding to the form of the article to be made, heel pieces on said cams actuated by the mandrel holders and progressively closing said cams when said holders gradually move towards the center of the plate, fixed gradients actuating the several operating members, and several material carrying reels on the frame of the machine and continuously feeding the said machine with layers of wire or sheet placed side by side.

In testimony whereof I have signed my name to this specification.

FRANCIS ATHIMON.